(12) United States Patent
Pham et al.

(10) Patent No.: US 10,657,176 B1
(45) Date of Patent: May 19, 2020

(54) ASSOCIATING OBJECT RELATED KEYWORDS WITH VIDEO METADATA

(71) Applicant: Amazon Technologies, Inc., Seattle, WA (US)

(72) Inventors: Dominick Khanh Pham, Seattle, WA (US); Sven Daehne, Seattle, WA (US); Mike Dodge, Seattle, WA (US); Janet Galore, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/437,649

(22) Filed: Jun. 11, 2019

(51) Int. Cl.
*H04N 9/80* (2006.01)
*G06F 16/783* (2019.01)
*G06F 16/732* (2019.01)
*G06F 16/78* (2019.01)

(52) U.S. Cl.
CPC ...... *G06F 16/7837* (2019.01); *G06F 16/7335* (2019.01); *G06F 16/7834* (2019.01); *G06F 16/7867* (2019.01)

(58) Field of Classification Search
CPC ........... H04N 21/4828; H04N 21/4722; H04N 21/8133; H04N 21/812; Y10S 707/99933
USPC .......................... 386/241, 248, 278, 285, 281
See application file for complete search history.

(56) References Cited

U.S. PATENT DOCUMENTS

| 8,990,692 B2 * | 3/2015 | Chelba | H04N 5/44591 |
| | | | 715/719 |
| 9,824,691 B1 * | 11/2017 | Montero | G10L 15/265 |
| 2012/0323897 A1 * | 12/2012 | Daher | G06F 16/433 |
| | | | 707/723 |
| 2016/0342590 A1 * | 11/2016 | Paulin | G06F 16/93 |

OTHER PUBLICATIONS

U.S. Appl. No. 16/432,841, "Generating Video Segments Based on Video Metadata," filed Jun. 5, 2019.

* cited by examiner

*Primary Examiner* — Robert Chevalier
(74) *Attorney, Agent, or Firm* — Patterson + Sheridan, LLP

(57) ABSTRACT

A video tagging system that can generate tags corresponding to associations of object-related keywords mentioned in a video to time instances in the video is described. The video tagging system identifies a particular object associated with a video. Using a transcription of audio content within the video, the video tagging system determines a keyword mentioned in the audio content that is associated with the object and a time instance within a timeline of the video when the keyword is mentioned. The video tagging system generates a tag that associates the keyword with the time instance and sends an indication of the tag to a user device. Once the video is displayed on the user device, the user can search for the keyword. This prompts the user device to display a marker indicating the time instance when the keyword is mentioned.

20 Claims, 11 Drawing Sheets

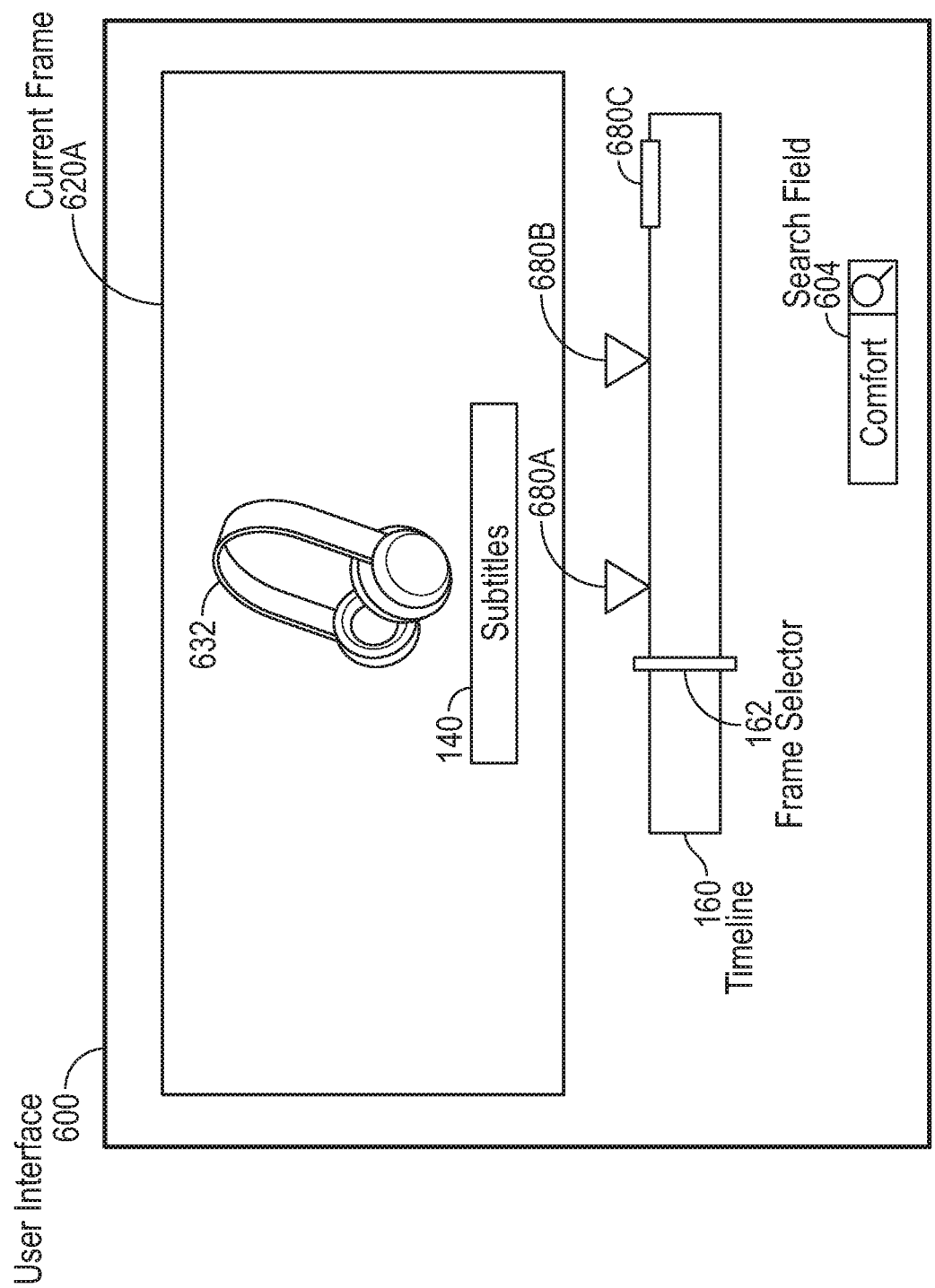

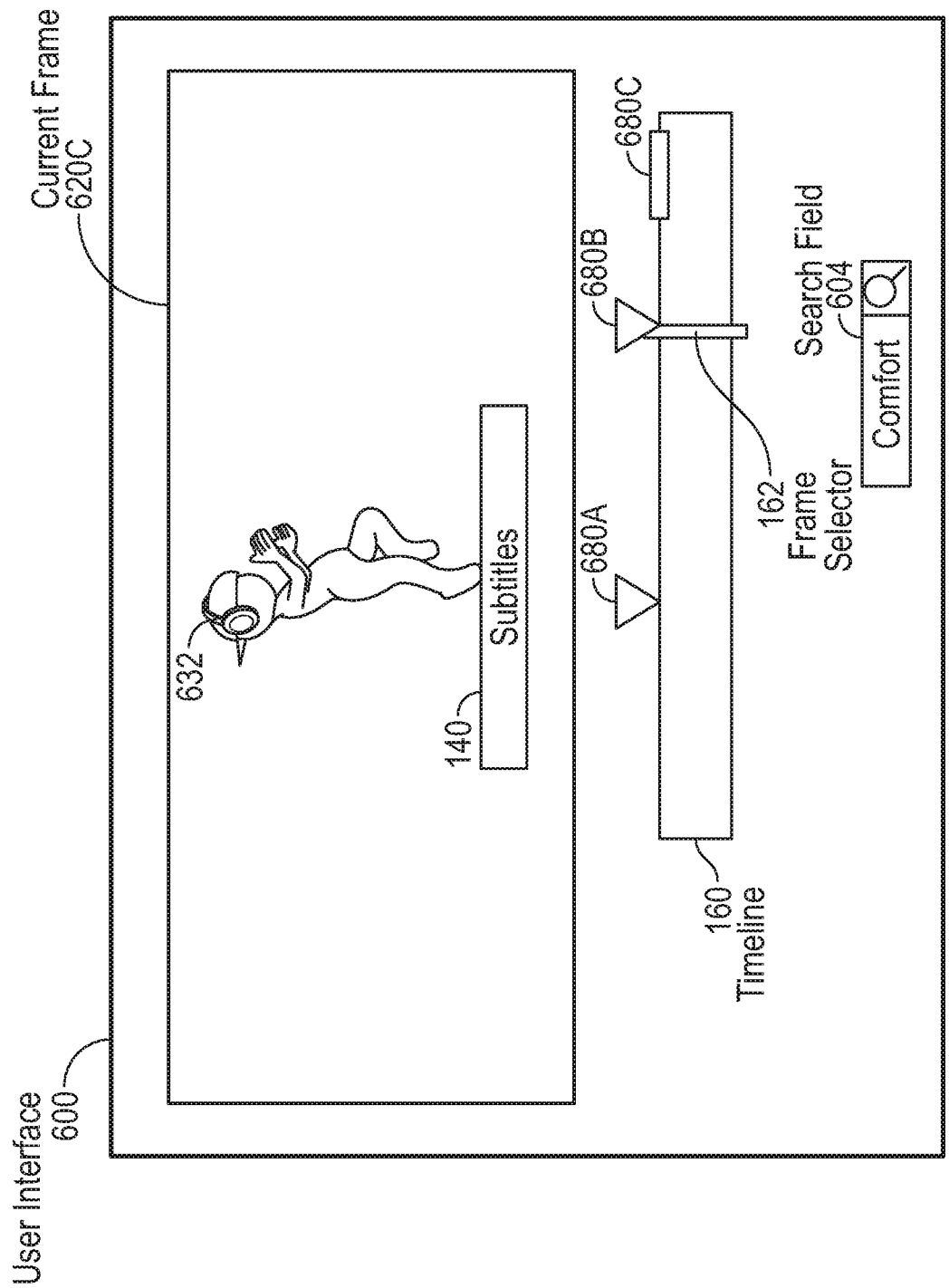

ASSOCIATING OBJECT RELATED KEYWORDS WITH VIDEO METADATA

BACKGROUND

The present invention relates to associating object-related keywords (or attributes) in a video with video metadata (e.g., a video timestamp).

Currently, video consumption, navigation, and interaction is fairly limited. For example, users can fast forward a video, rewind the video, or scrub the seeker to skip to different segments in the video. This limited interaction allows for some level of coarse searching and navigation of a video, but does not allow a user to search for specific words/phrases mentioned in the video. This is due in part to the lack of contextual metadata available for the video. As a result, searching and navigating the contents of a video (or a collection of videos) for particular content is laborious and inefficient.

BRIEF DESCRIPTION OF DRAWINGS

FIGS. 6A-6C illustrate an example user interface of a user device, according to one embodiment.

DETAILED DESCRIPTION

Figure 1:
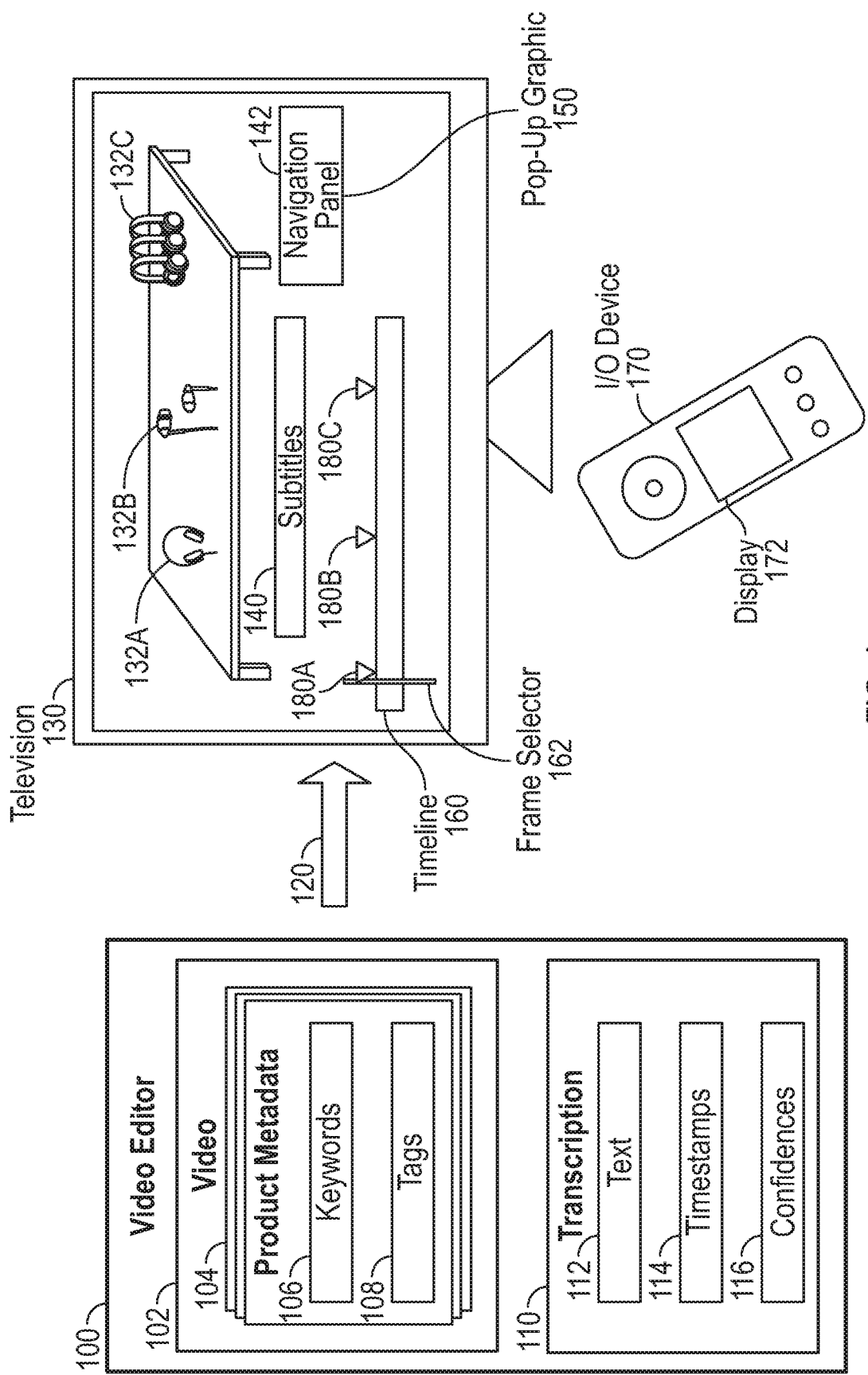
FIG. 1 illustrates presenting markers on a user device to indicate time instances when object-related keywords are mentioned in the video, according to one embodiment.

Embodiments herein describe a video tagging system that can mark, within a timeline (or duration) of a video, occurrences of keywords associated with an object (e.g., product) (or a collection of objects) in the video. For example, the video may be a review video describing the performance of different travel headphones, a promotional video advertising different items for decorating a house, a video advertising sporting equipment for sale, etc. The video tagging system can identify the object(s) that is associated with a video (e.g., the object appears in and/or is mentioned in the video) based on an object identifier(s) (or identities) (IDs) associated with the video. Assuming the object is a product for sale, the product ID can include, e.g., a particular brand and model of a smartphone, a model number of a toy set, or a standard identification number.

Based on knowledge of the product ID(s) that appears in the video, the video tagging system can use transcription data of audio content associated with the video to identify terms (or keywords) mentioned in the video that are relevant to one or more attributes of the object(s). Assuming the object is a product for sale, the attributes can include, e.g., a type of the product for sale (e.g., basketball, shoe, clothing item, etc.), a brand name of the product (e.g., Brand A headphone, Brand B headphone, etc.), a physical feature of the product (e.g., size, shape, color, etc.), and the like. The attributes of the object can be identified based on information associated with the object ID for the object. Such information can include, but is not limited to, product reviews, product description, a detailed product page, visual appearance of the product, etc.

The video tagging system enables a user to easily search and navigate for particular content within a video (or a collection of videos). The video tagging system can create markers on a user device playing the video to indicate to a user the relevant time instances where the terms (or keywords) are mentioned. For example, a user may identify an object (e.g., a product for sale, an actor in a scene, etc.) that the user is interested in from a video displayed on a user device (e.g., a television, tablet, smartphone, etc.). Using the user device (or an input/output (I/O) device communicatively coupled to the user device), the user can search for terms relevant to the object in the video. For example, the user may search for "sound quality" for a pair of headphones that are mentioned in the video. In this example, the user device can retrieve the relevant tags associated with "sound quality," and display markers on the user interface (UI), indicating the occurrences (e.g., time instances or timestamps) where "sound quality" (or other keywords related to "sound quality") is mentioned in the video. The markers enable the user to quickly navigate to different portions (e.g., frames) of the video that the user is interested in. In this manner, embodiments help the user to easily learn more information about the object associated with the video. This, in turn, enables the user to make a more informed decision as to whether the user would like to purchase the product in the video.

FIG. 1 illustrates presenting markers on a user device to indicate time instances when object-related (e.g., product-related) keywords are mentioned in the video, according to one embodiment. FIG. 1 includes a video editor 100, a television 130, and an I/O device 170. In one embodiment, the video editor 100 adds product metadata 104 into a video 102, based on a transcription 110 corresponding to the video 102. For example, the product metadata 104 includes additional contextual information regarding the product in the video that may help a user viewing the video 102 to decide whether to purchase the product in the video 102. In this embodiment, the product metadata 104 includes keywords 106 and tags 108.

The transcription 110 includes text 112, timestamps 114, and confidences 116. The text 112 includes words transcribed from the audio content in the video 102. The timestamps 114 include, for each word in the text 112, the timestamp when the word is mentioned in the (audio content of the) video 102. The confidences 118 include, for each word in the text 112, the confidence (or accuracy) level that the word in the text 112 has been accurately transcribed from the audio content. Although not shown in FIG. 1, in one embodiment, the transcription 110 may be stored in and retrieved from another location (e.g., in the cloud).

The keywords 106 generally act as search terms for different content within the video 102. For example, the keywords 106 can include terms relevant to the object(s) in the video 102. As described in more detail below, in some cases, the keywords 106 can include terms (or words) mentioned in the video 102 (e.g., as determined from the transcription 110). In some cases, the keywords 106 can include terms (or words) that are not mentioned in the video 102 (e.g., as determined from the transcription 110), but that are related to other terms mentioned in the video 102 about the object.

In one embodiment, the user may use the I/O device 170 to manually input (or search) for a keyword 106. For example, the user may have identified (via subtitles 140) a particular term (e.g., "comfort") mentioned in the video 102 that is related to a product (e.g., headphones) in the video 102, and may use the I/O device 170 to search for relevant portions (e.g., frames) of the video that mention "comfort." In another example, the user may infer that a keyword (e.g., "fabric") is mentioned in a video about clothing items, and use the I/O device 170 to search for the keyword. In yet another example, the video editor 100 may generate a set of keywords 106 to display to the user, based on the transcription 110. In this case, the keywords 106 may be displayed in a navigation panel 142 or on the I/O device 170 itself, if provisioned with a screen/display 172 and communication infrastructure (e.g., Bluetooth) to allow communication with the video editor 100. As described below, the user can select one of the keywords 106 to navigate (or jump) to the relevant portion (frame) of the video that mentions (or is related) to the searched keyword.

The tags 108 include associations between the keywords 106, timestamps 114, and the object(s) in the video 102. That is, the tags 108 indicate the relevant timestamps 114 when the keywords 106 associated with an object are mentioned (or indirectly mentioned) in the video 102. As described below, the indications (e.g., markers) of the tags may be displayed on the user device (e.g., television 130) in various formats.

In some embodiments, rather than indicate the exact timestamp 114 where the keyword 106 occurs within the video 102, the tags 108 may indicate a timestamp 114 of a different word within the video 102 relative to the occurrence of the keyword 106. For example, in some cases, the transcription 110 may infer punctuations used in the text 112 and indicate when periods, commas, and other punctuation occurs. Assuming this information is available, the tag 108 can indicate a timestamp 114 corresponding to the beginning of a sentence (or phrase) that includes the keyword 106 as opposed to the timestamp 114 corresponding to the exact time instance when the keyword 106 is mentioned in another portion of the sentence (or phrase). In another example, the tag 108 can indicate a timestamp 114 corresponding to another word that is a predefined distance away from (e.g., N words prior to) the keyword 106. In this manner, contextual data surrounding the keyword 106 that may be helpful to the user in learning (or understanding) more about the object can be preserved.

In one embodiment, the keywords 106 and the tags 108 are stored in one or more files as metadata. The metadata can be stored with the video (e.g., in addition to the audio the audio and visual data of the video) or can be stored elsewhere (e.g., in the cloud). For example, when the user inputs a particular keyword, a user device can retrieve the keywords 106 and/or the tags 108 from a server (e.g., in the cloud).

The arrow 120 illustrates transferring the video 102 to a television 130. For example, the television 130 may be internet-capable so it can download the video 102 from a video distribution system. A user (not shown) can use the I/O device 170 to play the video 102 on the television 130. For example, the I/O device 170 can include controls for navigating through a UI (on the television 130) which offers multiple videos, selecting a video, and playing the selected video. In this example, the I/O device 170 is a remote that includes interactive buttons and controls. In one embodiment, the I/O device 170 allows the user to input (e.g., via an interactive keyboard displayed on the UI on the television 130) queries containing keywords related to an object (e.g., product for sale) displayed (or mentioned) in the video 102. Additionally, or alternatively, in one embodiment, the I/O device 170 includes an audio device (e.g., a microphone) for receiving audio input from the user. Using the audio device, the user can input queries (or searches) for keywords 106 related to a product displayed (or mentioned) in the video 102. The I/O device 170 also includes a screen/display 172, which allows the user to interact with content received from video editor 100 and/or the television 130. The screen/display 172 can be implemented as a touch screen interface.

As the video 102 plays, the user may see (or hear about) an object (e.g., product for sale) the user wishes to learn more about. In this example, the current frame of the video 102 being displayed on the television 130 includes three products 132 (e.g., a first headphone device (product 132A), a second headphone device (product 132B), and a third headphone device (product 132C)). Using the I/O device 170, the user can search for a keyword 106 related to one of the products (e.g., product 132A) or for more information related to a collection of products (e.g., products 132 A-C). As noted, the keyword 106 can be a word that has been mentioned in a previous (or current) frame in the video 102, a word that appears in subtitles 140, a word that the user infers will be mentioned in the video 102 about the product, a suggested word (generated by the video editor 100) that appears in the navigation panel 142, a brand name of the product (e.g., "Brand A"), etc.

The I/O device 170 can include a scroll wheel or arrow keys to navigate to different parts of the UI on the television 130 in order to search for a keyword 106. For example, using (left, right, up, and down) arrow buttons, the user can navigate through different keywords 106 presented in the navigation panel 142, keywords presented in subtitles 140, etc. Once a keyword 106 is highlighted, the user can use a different button to submit a query for the selected keyword 106. In another example, rather than navigating through subtitles 140 and navigation panel 142, the user can use the arrow buttons to type a keyword 106 on a virtual keyboard within the UI of the television 130. In yet another example, rather than using buttons, keys, or capacitive elements, the user could use voice commands (e.g., "search for audio quality") to submit a query for a keyword 106. In yet a further example, the user can navigate on the I/O device itself, via the screen/display 172.

Once the user submits a keyword 106, the television 130 presents markers 180 in the timeline 160 to identify the time instances when the keyword 106 is mentioned (or indirectly mentioned) the video 102. In this particular example, the television 130 presents three markers 180A, 180B, and 180C that indicate different time instances when the keyword 106 is mentioned. Using the I/O device 170, the user can select the different markers 180A-C to jump to the frame of the video 102 that is related to the keyword 106, e.g., to learn more information regarding the product. In some examples, the user can select the frame selector 162 to navigate to the different markers 180A, 180B, and 180C to learn more information regarding the product. As discussed below, the markers 180A-C can be displayed on the television 130 in various formats. For example, in some embodiments, the markers 180A-C could be in the form of a thumbnail video frame, which may provide the user with a better visual context for the object in question.

Depending on the user's current interaction with the video 102, the television 130 can display the navigation panel 142 in a pop-up graphic 150. That is, the pop-up graphic 150 may overlay certain portions of the video 102 being displayed. In some embodiments, the pop-up graphic 150 may appear adjacent to the video 102, e.g., in a side panel of a UI on the television 130. In some embodiments, the pop-up graphic 150 may appear when the video 102 has been paused.

While the embodiments herein primarily discuss associating product-related keywords with timestamps in a video 102 and presenting markers to indicate the occurrences of the product-related keywords in the video 102, this disclosure is not limited to products for sale and can be used for other applications. For example, the embodiments herein can be used to enhance user experience when watching a television show or movie. Instead of associating the timestamps with product-related keywords, the video editor 100 can generate and associate the timestamps to keywords related to actors in a scene. For example, the user can search for the actor's name to find timestamps of other scenes in the current show in which the actor appears. In general, using the techniques described herein, the video editor 100 can generate and associate keywords related to any object (e.g., product for sale, a person, object, geographical landmark, etc.) in a video 102 with timestamps in the video. Further, while the embodiments herein discuss objects associated with video, embodiments can be applied to audio feeds (e.g., without the need for a video feed). Embodiments can also be applied to live video content. For example, using the techniques presented herein, metadata can be created during the live broadcast, allowing the user to search the portion of the broadcast that has been transmitted.

Figure 2:
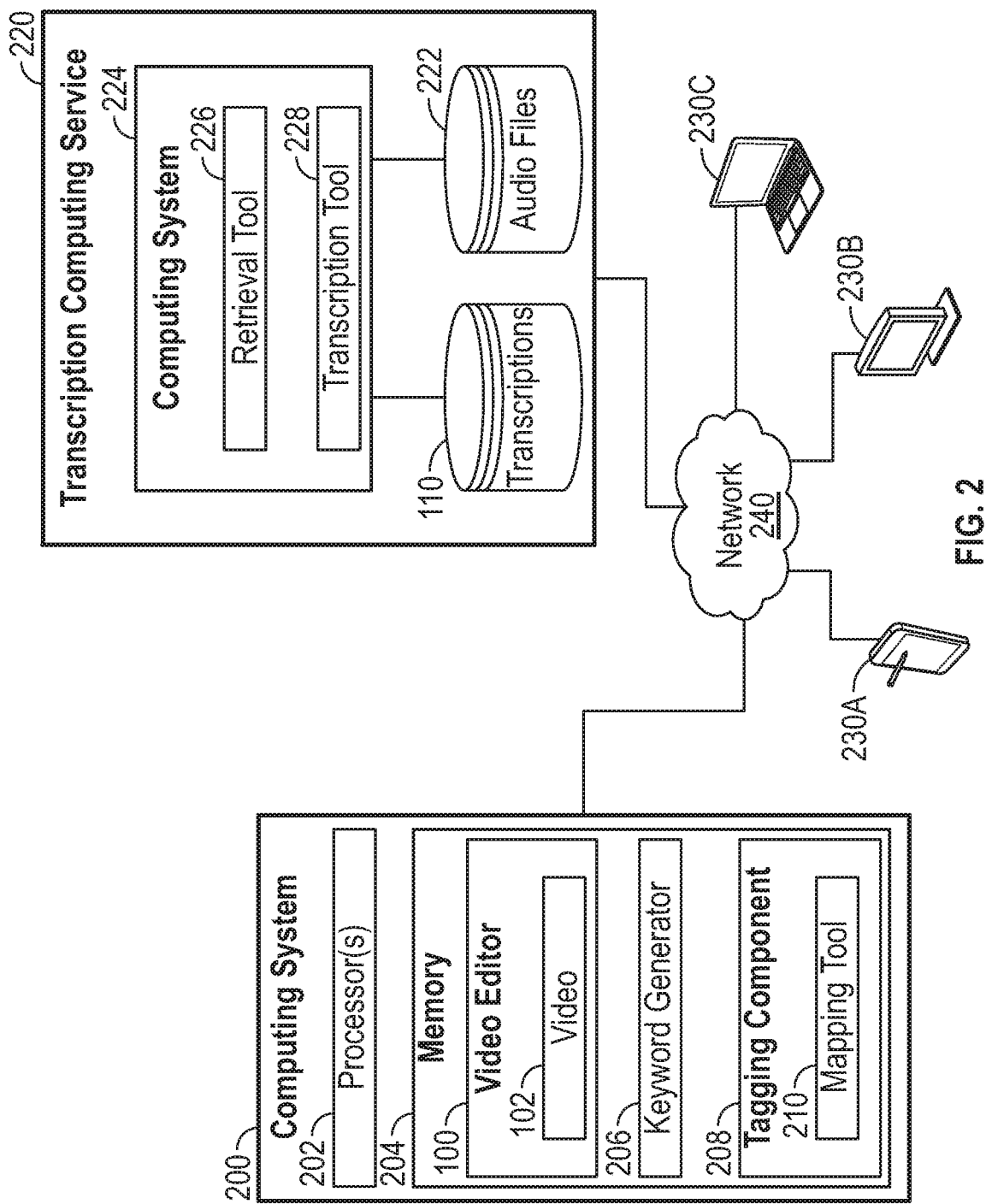
FIG. 2 is a block diagram for generating tags that associate an object-related keyword with a time instance in a video, according to one embodiment.

FIG. 2 is a block diagram for generating tags that associate an object-related keyword with a time instance in a video, according to one embodiment. FIG. 2 includes a (tagging) computing system 200, a network (e.g., video distribution network) 240, a transcription computing service 220, and user devices 230. The computing system 200 includes a processor(s) 202 and memory 204. The processor(s) 202 represents any number of processing elements which can include any number of processing cores. The memory 204 can include volatile memory, non-volatile memory, and combinations thereof.

The memory 204 includes the video editor 100, a keyword generator 206, and a tagging component 208. The video editor 100 may be a software application executing on the computing system 200. In one embodiment, the video editor 100 permits a user to generate keywords 106 associated with objects in a video 102 and generate tags 108 corresponding to time instances when the keywords 106 are mentioned in the video 102. This process is described in more detail below.

The keyword generator 206 may be a software application executing on the computing system 200. The keyword generator 206 generates keywords 106 associated with different objects that appear (and/or are mentioned) in a video 102. Rather than use keyword inputs provided by a user, the keyword generator 206 can evaluate the transcription of the audio content associated with the video and determine a set of keywords 106 relevant to one or more attributes of a given object in the video. In one embodiment, the keyword generator 206 can analyze the transcription using one or more techniques to determine the set of keywords 106 relevant to a given object. These techniques can include, but are not limited to, determining frequency (or number occurrences) of words, filtering (or removing) non-stop words, computing term relevance scores of the words relative to an attribute(s) of an object, identifying different parts of speech used for the words, named entity recognition, etc.

Additionally, in some embodiments, the keyword generator 206 can generate keywords 106 that may or may not be mentioned in the video 102 (e.g., the keywords 106 do not appear in the transcription). For example, the keyword generator 206 can use video-to-product associations to retrieve other contextual information regarding objects in the video (e.g., product attributes, customer reviews, related videos, etc.). Using this data, the keyword generator 206 use machine learning tools (e.g., applications, algorithms, etc.) to identify related keywords 106 to the objects in a given video. The keyword generator 206 can determine (e.g., using a machine learning tool) that a similarity between a first keyword (not mentioned in the video 102) and a second keyword (that is mentioned in the video 102) satisfies a condition (e.g., is greater than or equal to a threshold).

In some embodiments, the keywords 106 that are generated by the keyword generator 206 can be used as navigation anchors (e.g., markers or links) to different time instances within the video. For example, the set of keywords 106 can be presented within a navigation panel 142 on a UI of the user device. In this manner, the keyword generator 206 can proactively suggest object-related keywords that may be of interest to the user.

In some embodiments, the keyword generator 206 can rank (or adjust the relevance of) keywords 106, based on external inputs (e.g., user preferences, user search/navigation history, etc.). For example, the keyword generator 206 may determine, based on previous user history, that the user has a preference for "comfort" attributes when shopping for headphones. Absent this information, the user may have been presented with the following ordered list of keywords: "battery life, charge time, comfort, fit, size, etc. However, once the user's history is accounted for, the keyword generator 206 can modify the ordered list of keywords to be the following: comfort, fit, size, battery life, charge time, etc.

In some embodiments, the keyword generator 206 can rank (or adjust the relevance of) suggested keywords, based on similarities to other words within a given context. For example, for a video about headphones, the keyword generator 206 can determine, based on a similarity (or distance) metric, that the keyword "battery life" is highly related (or similar) to another word "charge time" (e.g., the distance between the two words is below a threshold). Similarly, the keyword generator 206 can determine, based on the similarity (or distance) metric, that the keyword "comfort" is highly related to another word "fit." In these cases, the keyword generator 206 can adjust the order of the suggested keywords, such that the words "comfort" and "fit" appear closer together, and the words "battery life" and "charge time" appear closer together. Doing so can enable additional keyword associations that may not be present in the transcription. For example, as described below, the tagging component 208 can also use the similarity (or relatedness) between words to associate unmentioned keywords to time instances corresponding to mentioned keywords, and vice versa. Assuming a user searches for a word that is not mentioned in the video, the tagging component 208 can associate the timestamp for the unsearched word to the related searched word. As an example, "comfort," may not be mentioned in a video about headphones, but "fit" is mentioned in the video. Thus, if a user searches for "comfort," a marker indicating the timestamp for "fit" can be displayed on the user device.

The tagging component 208 may be a software application that generates tags 108 to identify associations between timestamps 114 in a video and keywords 106. The tagging component 208 includes a mapping tool 210. In situations where a transcription of the audio content within a video is unavailable or the transcription does not include timestamp information, the mapping tool 210 can employ acoustic pattern recognition techniques (applied solely to the audio content without analyzing transcription data) to identify time instances in the video associated with keywords 106. The mapping tool 210 can retrieve the audio feed from the video 102 and compare acoustic features (e.g., audio frequency, pitch, tone, etc.) of different portions of the audio feed to a set of audio fingerprints associated with the set of keywords 106. For example, a video that advertises different items for decorating a house can play different theme music depending on the location within the house (e.g., a first song when discussing kitchen items, a second song when discussing bedroom items, etc.). In this example, an audio fingerprint based on the first song can be associated with kitchen item related keywords, another audio fingerprint based on the second song can be associated with bedroom item related keywords, and so on. Assuming the mapping tool 210 is able to match a portion of the audio feed to one of the audio fingerprints associated with a given keyword 106, the mapping tool 210 can associate the timestamp for that portion of the audio feed to the keyword 106.

In another embodiment, the mapping tool 210 can use the transcription 110 of the audio extracted from the video 102 to identify associations between the timestamps 114 and keywords 106. In this case, the mapping tool 210 can identify the keyword 106 in the text 112 of the transcription 110, extract the timestamp 114 (in the transcription 110) corresponding to the keyword 106, and use the extracted timestamp 114 as the relevant time instance in the video 102 to associate with the keyword 106. As noted, in some cases, rather than mapping the keyword 106 to the exact timestamp 114 when the keyword 106 is mentioned in the video 102, the mapping tool 210 can use the transcription 110 to identify another time instance corresponding to a different starting point within the video 102. For example, if the keyword 106 occurs in the middle of the sentence, taking the user exactly to the portion of the video corresponding to the middle of the sentence may not be useful since the context surrounding the use of the keyword 106 can be lost. Thus, rather than associating the keyword 106 to the time instance corresponding to the middle of the sentence, the mapping tool 210 can associate the keyword 106 to a time instance corresponding to the start of the sentence. To do so, the mapping tool 210 can identify another timestamp 114 of a word in the transcription 110 in proximity to the keyword 106 and associate that timestamp 114 to the keyword 106.

The transcription computing service 220 provides transcriptions of audio and video content. The transcription computing service 220 includes one or more computing systems 224 for providing transcriptions. Here, the computing system 224 includes a retrieval tool 226 and a transcription tool 228. The retrieval tool 226 receives video 102 and extracts audio content (or feed) from the video 102. The retrieval tool 226 may store the extracted audio content into an audio file 222. The transcription tool 228 employs natural language processing/speech recognition techniques and/or machine learning techniques to generate a transcription 110 of the audio content in the audio file 222.

The network (e.g., video distribution network) 240 can be a wide area network (WAN) or a local access network (LAN) which distributes the video 102 to the user devices 230. The network 240 can be hosted in a cloud computing environment. In one embodiment, the network 240 is part of a subscription service or provided for free to users who sign up for an account. In any case, the network 240 can provide a repository of videos that can be provided to the user devices 230 on-demand or as part of advertisements.

The user devices 230A, 230B, and 230C can be mobile phones, internet-capable televisions, laptops, tablets, streaming players (e.g., online media players), and the like. Using an I/O device (not shown, a user can pause the video 102 currently being played in order to learn more about a particular object (mentioned) in the video 102. The I/O device can be separate from the user device 230—e.g., a remote controller or mouse—or may be an integrated component in the user device 230—e.g., a touch screen or touch pad.

Figure 3:
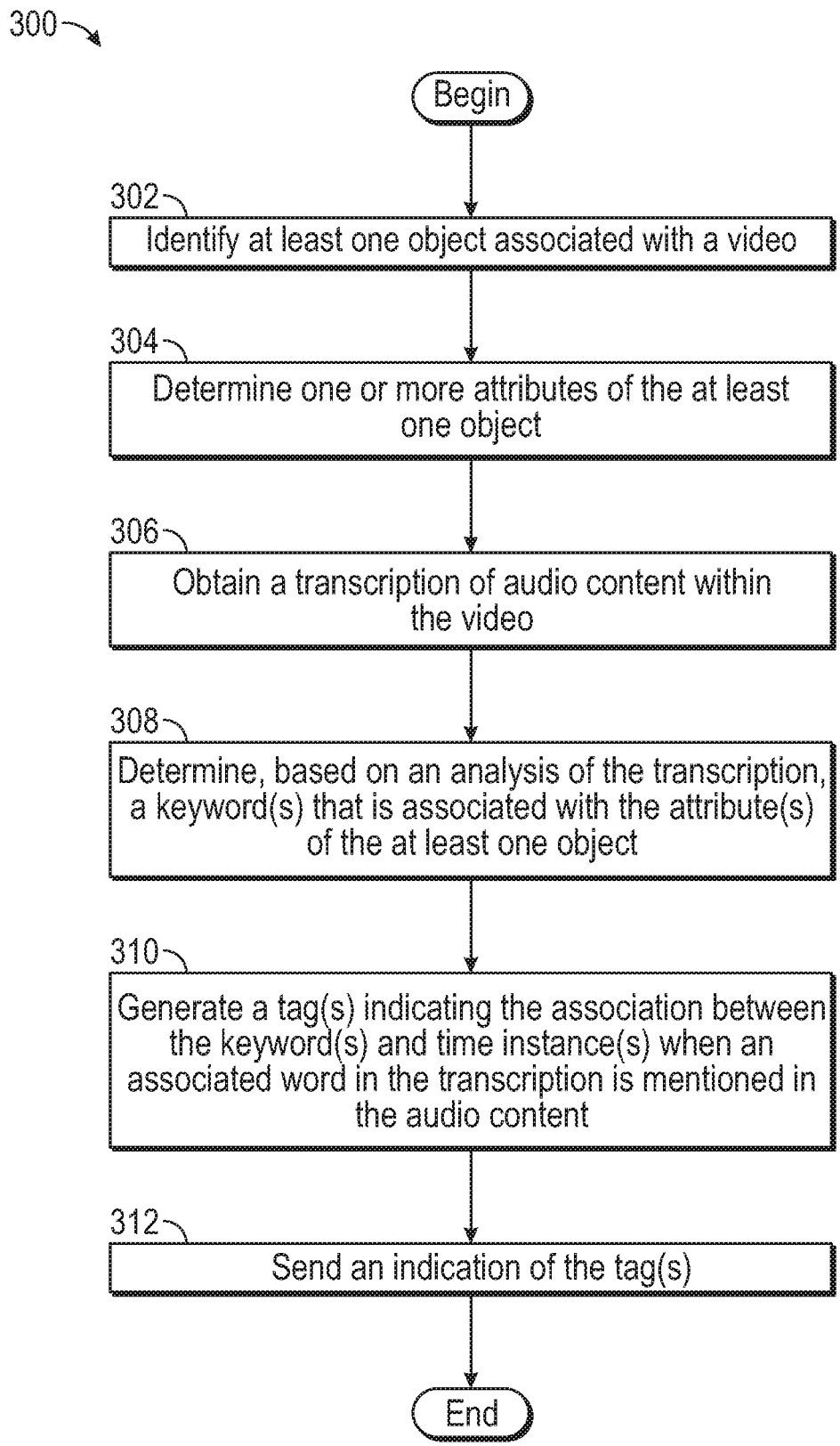
FIG. 3 is a flowchart of a method for generating tags that associate an object-related keyword with a time instance in a video, according to one embodiment.

FIG. 3 is a flowchart of a method 300 for generating tags that associate an object-related keyword with a time instance in a video, according to one embodiment. The method 300 may be performed by one or more components (e.g., video editor 100, keyword generator 206, tagging component 208, etc.) of a computing system (e.g., computing system 200).

The method 300 begins at block 302, where the computing system identifies at least one object associated with a video. As noted, the at least one object can include a product for sale, a person, a geographical landmark, etc. The computing system may identify the object(s) associated with the video based on a set of product IDs configured for that video. For example, the set of product IDs (or other identification information) for the object(s) may be stored within the video file or within a separate file. At block 304, the computing system determines one or more attributes of the object. As noted, the one or more attributes can include a type of the object, a Brand name of the object, a physical feature (e.g., size, shape, color, etc.) of the object, and the like. In some cases, the object attributes can be stored along with the product ID for the object (e.g., within the video file or within a separate file). In some cases, the object attributes can be determined from a catalog of items (e.g., maintained in a database). In general, the object attributes can be determined from any source of information related to the product ID for the object (e.g., product reviews, product description, detailed product page, visual appearance of the object, etc.).

At block 306, the computing system obtains a transcription of audio content within the video. In one embodiment, the computing system can retrieve the transcription from a database (e.g., transcriptions 110) storing different audio transcriptions for different videos. In one embodiment, the computing system can request the transcription computing service 220 to perform a transcription of the audio content. For example, the computing system can upload the audio content to the transcription computing service 220 and receive a transcription of the audio content in response. The transcription may include text of the words mentioned in the audio content. In one embodiment, in addition to the text, the transcription may include timestamped data indicating a time instance when each word in the text is mentioned in the video.

At block 308, the computing system determines, based on an analysis of the transcription, one or more keywords that are associated with at least one of the attributes of the at least one object. In one embodiment, the keyword(s) may include words (or terms) that are mentioned in the audio content that indicate one of the attributes of the object. For example, a keyword for a Brand A headphone device may be "Brand A," or headphones. In another example, a keyword for a laptop may be "battery life" relating to one of the components (e.g., battery) of the laptop. In another embodiment, the keyword(s) may (additionally or alternatively) include words (or terms) that are not mentioned in the audio content. For example, the unmentioned keywords may indicate one of the attributes of the object and be related or similar to one or more other keywords mentioned in the audio content.

In one embodiment, the keyword(s) may be provided to the computing system (e.g., via the video editor 100) by a user. For example, an advertiser or product reviewer may identify a set of relevant keywords associated with the product that a user may provide in a query about the product. As discussed below, the video editor 100 may provide a UI (e.g., UI 400) to enable a user to identify keyword(s) relevant to an object in the video.

While a user can provide relevant keyword(s) associated with an object in the video, in other embodiments, the keyword(s) can be generated by keyword generator (e.g., keyword generator 206) of the computing system. For example, the keyword generator can analyze the audio transcription to derive keywords based on one or more techniques.

In one example, the keyword generator can determine the frequency of words in the transcription and select words that satisfy a predetermined frequency threshold (e.g., frequency of occurrence is greater than a threshold) as keywords. In another example, the keyword generator can filter out (or down weight) stop words, such as "the," "a," "an," "in," etc., when processing the natural language data in the transcription. The keyword generator can filter out stop words before or after processing the natural language data in the transcription. In yet another example, the keyword generator can compute term weight (or relevance) scores (e.g., term frequency-inverse document frequency (TFIDF) scores) for words in the transcription relative to an attribute(s) of the object. In this example, the keyword generator can select words having a term weight score that satisfies a threshold (e.g., above a threshold) as keywords. In yet another example, the keyword generator can evaluate parts of speech used in the transcription to identify keywords relevant to an attribute(s) of the object. For example, the keyword generator can identify different adjectives (e.g., "comfortable," "loud," etc.) used in relation to the object (e.g., a noun, such as "headphones") and use the adjectives (or similar words) as keywords. In yet another example, the keyword generator can use named entity recognition techniques (also known as entity identification, entity extraction, etc.) to classify terms in the transcription into pre-defined categories, which are used as keywords. In sum, the keyword generator can employ any one of or combination of the above techniques to determine keywords relevant to the object in the video.

At block 310, the computing system generates one or more tags that each include an indication of the association between a keyword and the time instance when a word (in the transcription) associated with the keyword is mentioned in the audio content of the video. In one embodiment, the keyword and the associated word in the transcription may be the same. In this case, the time instance may correspond to the time instance when the keyword is mentioned in the audio content of the video. In another embodiment, the keyword may be another word in the transcription that is different from the associated word in the transcription. In this case, the time instance corresponding to the associated word may be prior to or subsequent to the time instance when the keyword is mentioned in the audio content. In yet another embodiment, the keyword may be different from the associated word and may not be a word that is mentioned in the audio content. For example, the keyword may be a word (e.g., "comfort") that is related (or similar) to another word (e.g., "fit") that is mentioned in the audio content.

In one embodiment, each tag includes an indication of the product ID, the keyword(s), and the starting time instance in the video associated with the keyword(s). In one embodiment, the one or more tags can be submitted to the computing system by a user, e.g., via the UI 400 of the video editor 100. In other embodiments, the computing system may automatically generate tags to indicate the time instances in the video associated with the keywords.

At block 314, the computing system sends an indication of the tags. In one embodiment, the tags can be stored in a file associated with the video (e.g., in the cloud) for later retrieval by a user device. In another embodiment, the computing system can package the tags along with the video and transmit the package to a user device.

Figure 4:
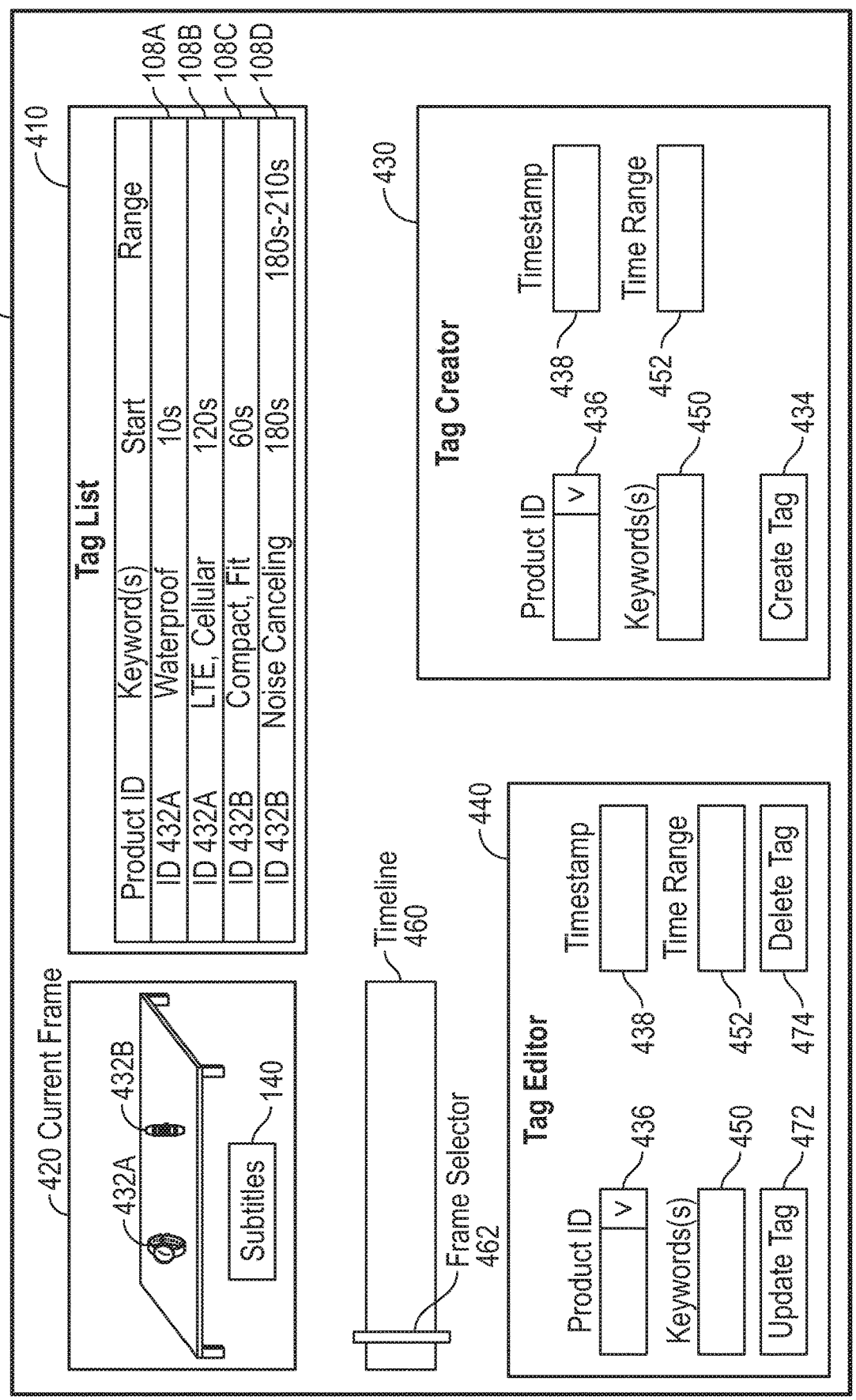
FIG. 4 illustrates an example user interface for generating tags that associate an object-related keyword with a time instance in a video, according to one embodiment.

FIG. 4 illustrates a UI 400 of the video editor 100 for generating tags that associate an object-related keyword with a time instance in a video, according to one embodiment. In one embodiment, the UI 400 can be used to perform one or more of blocks 302-312 of the method 300 depicted in FIG. 3. The UI 400 can be displayed on a computing system (e.g., computing system 200). The UI 400 includes a current frame 420, a timeline 460, a frame selector 462, a tag list 410, a tag creator 430, and a tag editor 440. Using the frame selector 462, the user can move across the timeline 460 to select a particular frame in the video, which is displayed as current frame 420. Put differently, the timeline 460 indicates the temporal location of each frame in the video. The frame selector 462 permits the user to select a particular one of the frames to be displayed as the current frame 420.

The tag creator 430 includes a Product ID field 436, a Timestamp field 438, a Keyword(s) field 450, and a Time Range field 452, which allow the user to create tags corresponding to time instances associated with keywords. The Product ID field 436 allows a user to select a product ID associated with one of the objects in the video being displayed and/or mentioned in the audio content associated with the video. In one embodiment, the Product ID field 436 is pre-loaded with a set of Product IDs associated with objects in the video. In this case, the user can select one of the product IDs via a drop-down button in the Product ID field 436. In another embodiment, the Product ID field 436 permits a user to type in product IDs for objects in the video. For example, the user can provide a standard identification number or other unique product ID for an object. In yet another embodiment, the Product ID field 436 may be a search field which permits the user to identify the standard identification number or unique ID by putting in general information such as the type of product, its manufacturer, partial product ID number, and the like. In this case, the Product ID field 436 can provide a list of potential IDs that match the criteria provided by the user from which the user can select the correct product ID. Note, that in other embodiments where the object is not a product for sale (e.g., the object is a person) the UI 400 can provide a field that lets the user identify the object (e.g., name of the actor).

The Keyword(s) field 450 permits a user to identify keywords (or terms) associated with the object (identified by the product ID) in the video. As noted, the user can select words or terms that are mentioned in the audio content associated with the video (e.g., the words or terms may appear in the subtitles 140). In other cases, the user can select words that are not mentioned in the audio content to associate with the object. The Timestamp field 438 permits a user to indicate a time instance in the video when the keyword is mentioned or a time instance that is related to the keyword (e.g., the keyword is indirectly mentioned). In some embodiments, the Timestamp field 438 can be automatically updated with a timestamp corresponding to a position of the frame selector 462 within the timeline 460.

The Time Range field 452 permits a user to indicate a region (or time range) within the video where multiple instances of the keyword are mentioned. For example, if the computing system (or user) determines that a predefined number of time instances (e.g., X number of time instances) related to the same keyword appear within a predefined time window (e.g., Y seconds), the computing system can indicate the time range in which the number of time instances are located. Doing so avoids multiple display markers (greater than a threshold) for the same keyword being presented on a user device.

The tag creator 430 includes a CREATE TAG button 434 that the user can select to create a tag based on the Product ID field 436, Timestamp field 438, Keyword(s) field 450, and Time Range field 452. In response, the created tag is added to the Tag List 410. In this example, the Tag List 410 include tags 108A, 108B, 108C, and 108D. Each tag 108 may include the product ID, keyword(s), and timestamp (corresponding to the time instance in the video when the keyword(s) are mentioned). For example, tag 108A indicates that: the timestamp for "waterproof" associated with object 432A (e.g., a first watch device) is at 10 seconds (relative to a start of the video); the timestamp for "LTE, cellular" associated with object 432A is at 120 seconds (relative to a start of the video); and the timestamp for "compact, fit" associated with object 432B (e.g., a second watch device) is at 60 seconds (relative to a start of the video). In some cases, in addition to the product ID, keyword(s), and timestamp, a tag can include a time range corresponding to multiple time instances in the video when the same keyword(s) are mentioned). Here, for example, tag 108D indicates that the starting timestamp for "noise canceling" associated with object 432B is at 180 seconds (relative to a start of the video) and that the time range for multiple references to "noise canceling" is between 180 seconds and 210 seconds.

The UI 400 allows the user to select a tag 108 in the Tag List 410 in order to preview the tag 108 in the current frame 420. Once a tag 108 is selected, the user can use the Tag Editor 440 to modify the tag 108 or delete the tag. In the Tag Editor 440, the user can modify values of the Product ID field 436, Timestamp field 438, Keyword(s) field 450, and Time Range field 452. Once modified, the user can select the UPDATE TAG button 472 to update the values of a tag 108 in the Tag List 410. Alternatively, the user can select the DELETE TAG button 474 to delete a tag 108 from the Tag List 410.

Figure 5:
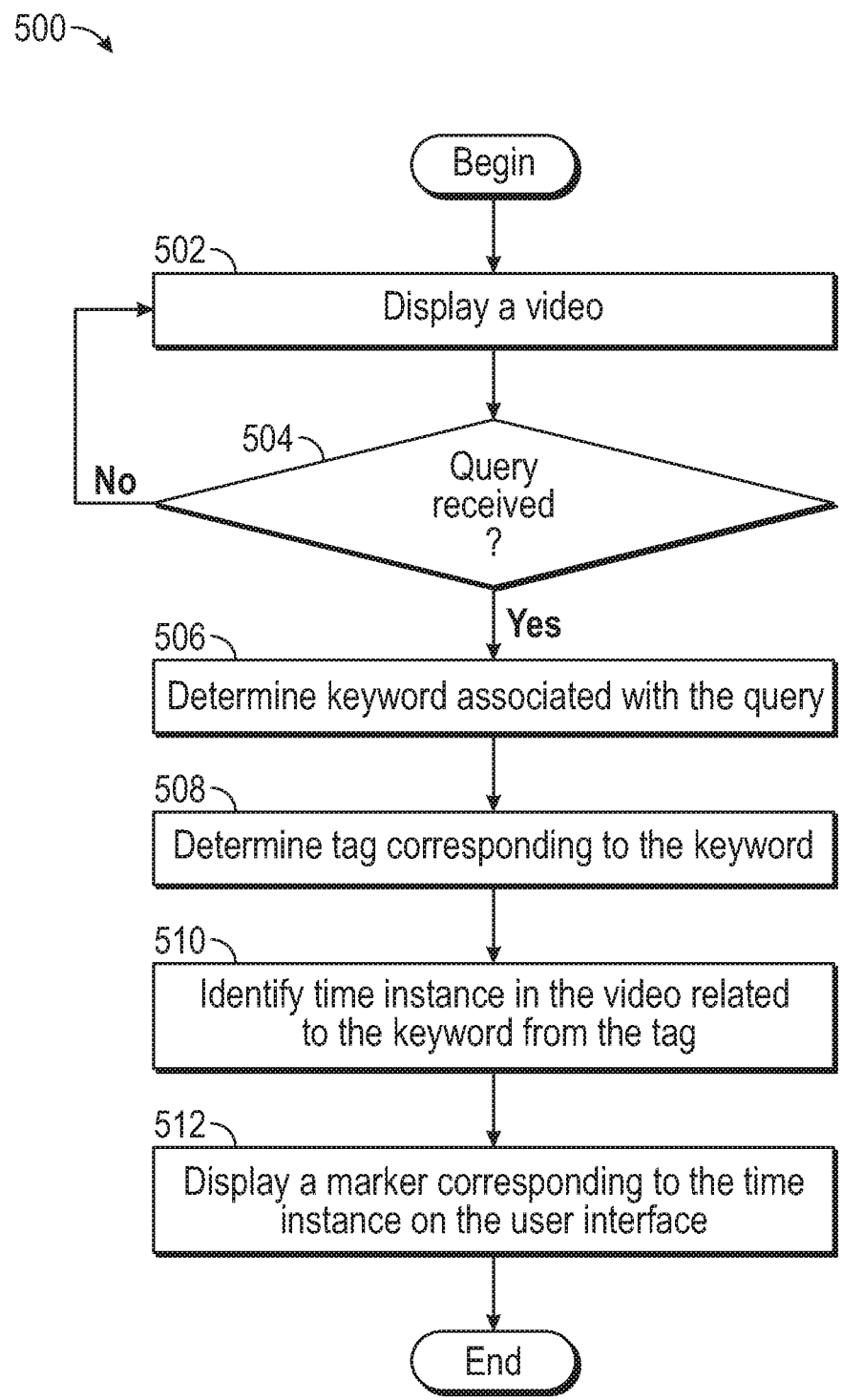
FIG. 5 is a flowchart of a method for displaying tags on a user device, according to one embodiment.

FIG. 5 is a flowchart of a method 500 for displaying tags on a user device, according to one embodiment. The method 500 may be performed by a user device (e.g., user device 230). In one embodiment, the method 500 is performed by a user device that has received a video that includes tags and audio/visual data of the video using the method 300 described above. The method 500 may begin when a viewer instructs the user device to play a video.

The method 500 begins at block 502, where the user device displays a video. As noted, the user can control when the user device plays the video using a separate I/O device (e.g., a remote) or an integrated I/O device (e.g., touchscreen or trackpad).

At block 504, the user device determines if a query has been received. For example, the user may have paused the video to submit a query regarding an object in the video the user is interested in. If the user device does not detect a query, the method 500 returns to block 502 where the user device continues to play the video. However, once the user device detects a query, the method proceeds to block 506.

At block 506, the user device determines a keyword associated with the query. In one embodiment, the user device may identify a term in the query that corresponds to a keyword for the video. For example, the user may have searched for a word (or term) mentioned in the video about an object. The user device can search metadata transmitted along with the video to determine if the term in the query is a keyword. In other embodiments, the user device may determine that terms in the query are not mentioned in the video. In this case, the user device can identify another keyword similar to the searched term. The user device may interact with the keyword generator 206 to identify a keyword similar to the searched term, given the context of the video. For example, the keyword generator 206 may use a machine learning algorithm (e.g., word2vec, GloVe, etc.) to compute a similarity or distance score between the searched term and other keywords associated with the object in the video, and select another keyword having a score that satisfies a particular threshold for the user device to use. The keyword generator 206 can provide an indication of the other keyword to the user device. In some embodiments, rather than interact with the keyword generator 206, the user device may be configured to use one or more machine learning algorithm(s) to determine a similar keyword.

At block 508, the user device determines a tag corresponding to the keyword. For example, the user device can search the metadata associated with the video to identify the tag corresponding to the keyword. In some embodiments, the user device can interact with another computing system (e.g., computing system 200) to retrieve the tag. For example, the user device can send a request that includes the keyword to the other computing system and receive, in response, the corresponding tag. At block 510, the user device identifies a time instance in the video related to the keyword from the tag.

At block 512, the user device displays a marker corresponding to the time instance on the user interface. In one embodiment, the user device can display the marker along the timeline (or seeker bar) 160. Note, however, that this is merely an example and that the marker can be displayed on the user interface in other locations and/or formats. FIG. 6A illustrates an example UI 600 of a user device, where markers 680A and 680B are displayed on the timeline 160. In this example, the video may be a review video describing a particular set of headphones (e.g., object 632). At the current frame 620A, the review video may be introducing the object 632, e.g., by describing various features of the object 632. The user may be interested in hearing more about the comfort (or fit) of the object 632. In this case, the user can search for "comfort" in the search field 604 on the UI 600. In response, the user device can display markers 680A and 680B corresponding to time instances when the "comfort" of the object 632 is mentioned in the video. In addition to markers 680A and 680B, the user device can display marker 680C to indicate a region within the video corresponding to multiple time instances when the "comfort" of the object 632 is mentioned in the video.

Figure 6B:
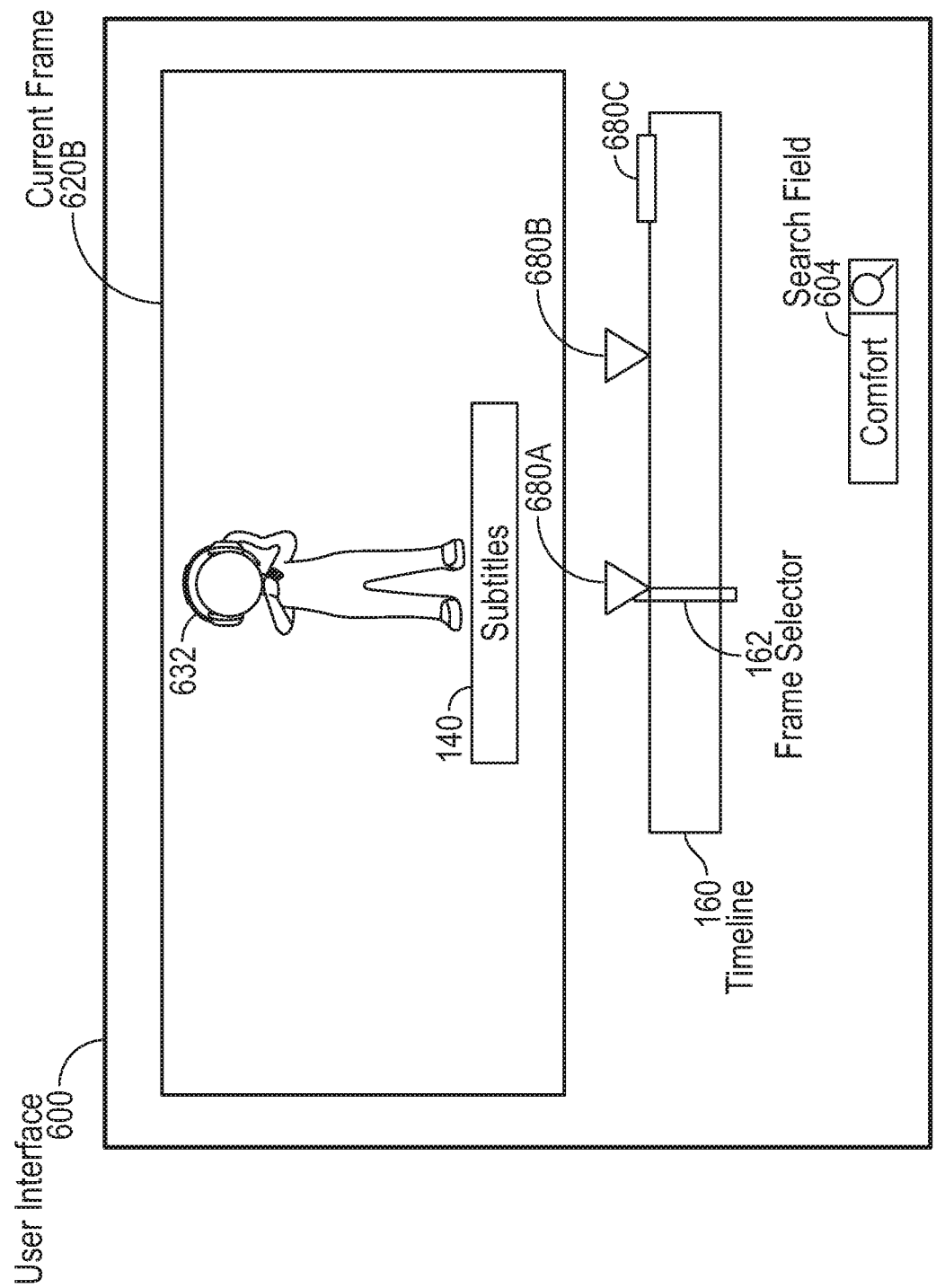

The user can select one of the markers 680A, 680B, and 680C to go directly to the timestamp corresponding to the keyword "comfort." As shown in FIG. 6B, after selecting the marker 680A, the user is taken to current frame 620B of the video where "comfort" of the object 632 is mentioned. Subsequently, as shown in FIG. 6C, after selecting the marker 680B, the user is taken to current frame 620C in the video where another instance of "comfort" of the object 632 is mentioned. Further, although not shown, after selecting the marker 680C, the user can be taken to a starting time instance of the time region corresponding to the marker 680C where multiple instances of "comfort" of the object 632 are mentioned.

Figure 7:
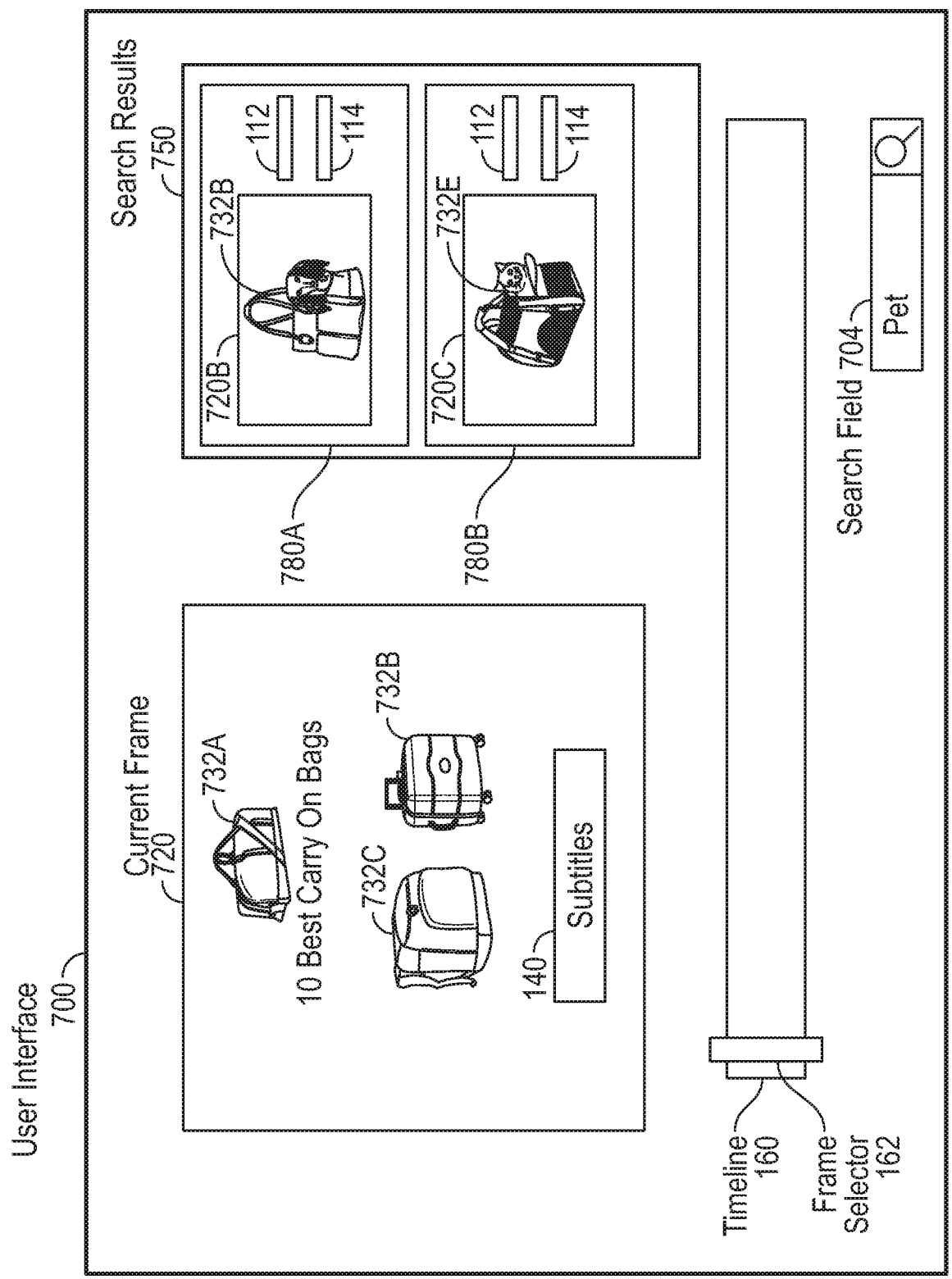
FIG. 7 illustrates another example user interface of a user device, according to one embodiment.

Referring again to block 512, in another embodiment, the user device can display the marker(s) in a list of results shown on the user interface, where the marker(s) indicates at least the timestamp corresponding to the keyword. In this case, the marker(s) can act as navigation anchors (or links) to various parts within the video. FIG. 7 illustrates an example UI 700 of a user device that displays marker(s) in search results 750. In one embodiment, search results 750 can be displayed in a panel (e.g., navigation panel 142) on the UI 700. In one embodiment, the search results 750 can appear as a pop-up graphic (e.g., pop-up graphic 150).

In the example depicted in FIG. 7, the video may be a review video describing the ten best travel carry-on bags (e.g., objects 732A, 732B, 732C, etc.). At the current frame 720, the review video may be playing an introductory title introducing the subject of the video. The user may be interested in hearing more about carry-on bags for pets. In this case, the user can search for "pet" in the search field 704. In response, the user device can display a set of markers 780A and 780B corresponding to the timestamps associated with the keyword "pet." Each marker 780 can include an image of the frame of interest, the timestamp, and corresponding portion of text. Here, the marker 780A includes an image of the frame 720B depicting object 732D, the timestamp 114, and corresponding text 112. Similarly, the marker 780B includes an image of the frame 720C depicting object 732E, the timestamp 114, and corresponding text 112.

In another embodiment, the user device can display markers (or links) corresponding to time instances in other videos where the keyword is mentioned. Using the example UI 700 depicted in FIG. 7, at least one of the markers presented in the search results 750 can correspond to a particular time instance in another video (e.g., about pet carry on bags) related to the current video.

Figure 8:
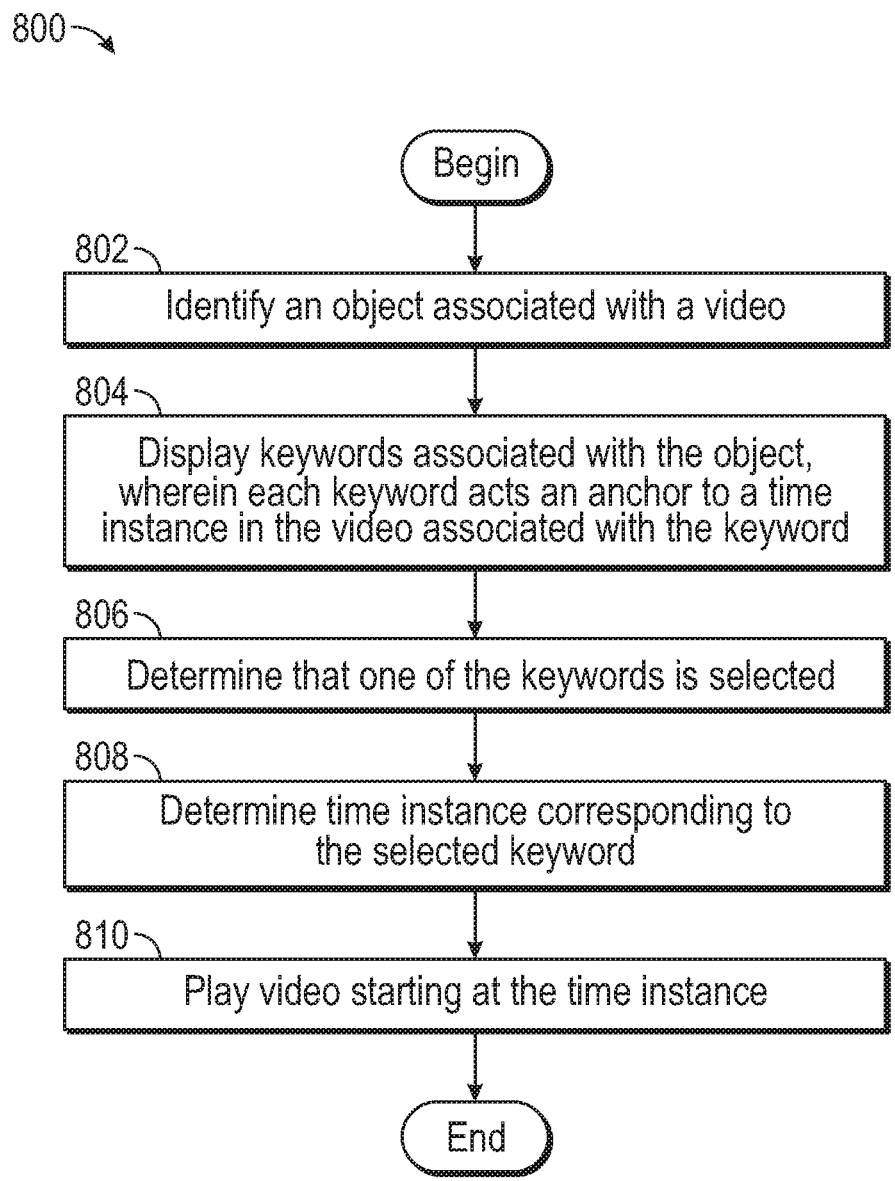
FIG. 8 is a flowchart of a method for using keywords as navigational anchors on a user device, according to one embodiment.

FIG. 8 is a flowchart of a method 800 for using keywords as navigational anchors on a user device, according to one embodiment. The method 800 may be performed by a user device (e.g., user device 230). In one embodiment, the method 800 is performed by a user device that has received a video that includes tags and audio/visual data of the video using the method 300 described above. In one embodiment, the method 800 may begin when a viewer instructs the user device to play a video. In one embodiment, the method 800 may begin when a viewer has paused a video playing on the user device.

The method 800 begins at block 802, where the user device identifies an object associated with a video. For example, the user device can identify the object based on the tags (indicating product IDs) transmitted along with the metadata of the video. At block 804, the user device displays one or more keywords associated with the object. For example, the user device can determine from the tags the keywords associated with the object and display the keywords in a pop-up graphic (e.g., pop-up graphic 150) on a UI of the user device. Each keyword acts as a navigational anchor (or hook or link) to the time instance in the video that is associated with the keyword (e.g., the keyword is mentioned or indirectly mentioned at the time instance, the keyword is mentioned within a threshold amount of time after the time instance, etc.).

At block 806, the user device determines that the user has selected one of the keywords. That is, the viewer can use the I/O device to select one of the keywords displayed on the UI of the user device by, for example, touching the keyword in a touch-sensitive screen, using arrows in a remote, using a cursor, and the like.

At block 808, the user device determines a tine instance in the video corresponding to the selected keyword. For example, the user device can retrieve from the metadata transmitted along with the video the tag corresponding to the selected keyword to determine the time instance when the keyword is mentioned in the video. At block 810, the user device plays the video starting at the time instance.

Figure 9A:
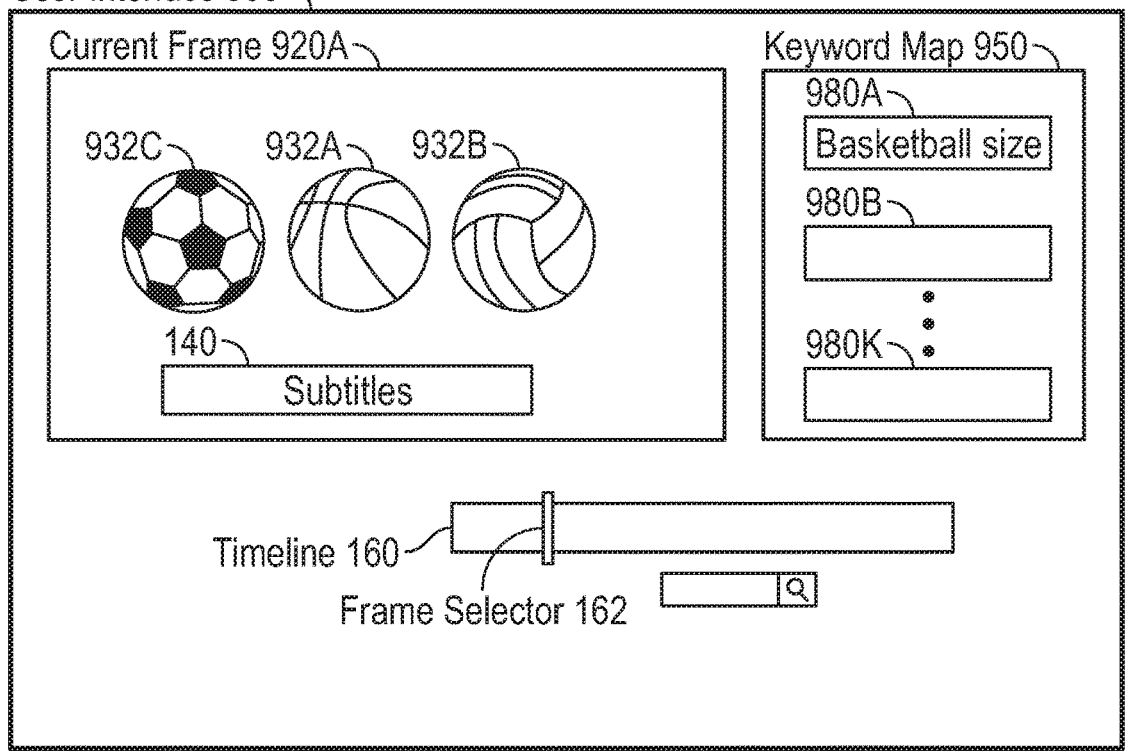
FIGS. 9A-9B illustrate yet another example user interface of a user device, according to one embodiment.
Figure 9B:
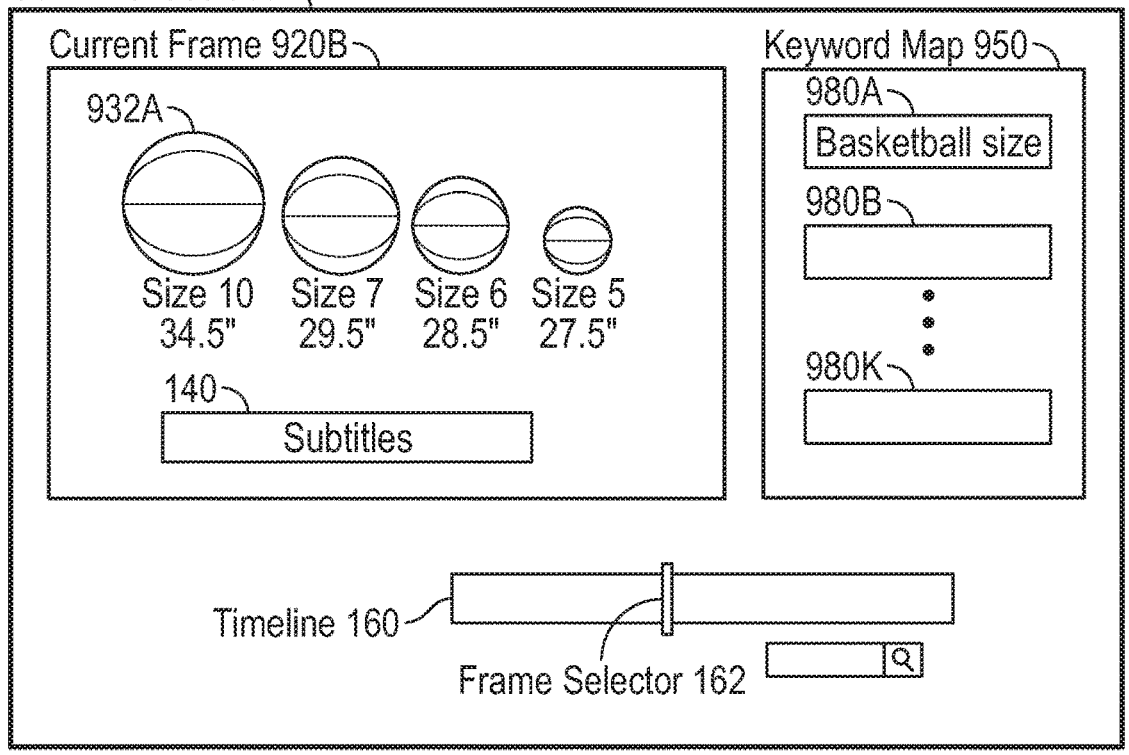

FIGS. 9A-9B illustrates an example UI 900 of a user device that displays suggested keywords to the user, according to one embodiment. In this example, the video may be an advertisement promoting different sports equipment (e.g., object 932A, object 932B, object 932C in current frame 920A). The user device can suggest keywords related to the objects that may be of interest to the user. As noted, these keywords may have been generated by the keyword generator 206, based on a transcription of the audio content in the video, and transmitted along with audio/visual data of the video.

Here, the UI 900 displays keywords 980A, 980B, . . . , 980K in a keyword map 950. The keyword map 950 can be displayed in a panel (e.g., navigational panel 142), as a pop-up graphic (e.g., pop-up graphic 150), in the current frame (e.g., current frame 920A), etc. Each keyword 980 acts as a navigational anchor to the time instance in the video associated with the keyword. As shown in FIG. 9B, after the user selects keyword 980A for "basketball size," the user is taken to current frame 920B in which "basketball size" is mentioned.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., video distribution network, transcription computing service) or related data available in the cloud. For example, the video distribution network could execute on a computing system in the cloud and distribute videos with embedded tags to the user devices. In another example, the transcription computing service could execute on a computing system in the cloud and distribute transcriptions of audio content in a video. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
   identifying a product for sale associated with a video;
   identifying one or more attributes of the product for sale;
   obtaining a transcription of audio content within the video, wherein the transcription comprises information indicating, for each word in the transcription, a time instance when the word is mentioned in the audio content within the video;
   determining, based on an analysis of the transcription of the audio content within the video, that a first word in the transcription is associated with at least one attribute of the one or more attributes of the product for sale;
   generating a tag that associates the first word with the time instance when the first word is mentioned in the audio content within the video; and
   transmitting the tag and the video as a package to a user device.

2. The computer-implemented method of claim 1, wherein determining that the first word in the transcription is associated with the at least one attribute of the product for sale comprises determining that the at least one attribute of the product for sale is indicated by the first word in the transcription.

3. The computer-implemented method of claim 2, wherein the one or more attributes of the product for sale comprises at least one of a type of the product for sale, a brand name of the product for sale, and a physical feature of the product for sale.

4. The computer-implemented method of claim 1, wherein the tag comprises a product identifier (ID) of the product for sale that uniquely identifies the product for sale, the time instance when the first word is mentioned in the audio content within the video, and the first word.

5. The computer-implemented method of claim 1, further comprising storing the tag in association with the user device.

6. A computer-implemented method comprising:
   identifying an object associated with a video;
   identifying one or more attributes of the object;
   obtaining a transcription of audio content within the video, wherein the transcription comprises information indicating, for each word in the transcription, a time instance when the word is mentioned in the audio content within the video;
   determining, based on an analysis of the transcription of the audio content in the video, a keyword that is associated with at least one attribute of the one or more attributes of the object and with at least one word in the transcription;
   generating a tag that associates the keyword with the time instance when the at least one word is mentioned in the audio content of the video; and
   storing the tag in association with the video.

7. The computer-implemented method of claim 6, wherein determining the keyword comprises:
   removing a plurality of stop words from the transcription;
   determining that a number of occurrences of the at least one word in the transcription after removing the plurality of stop words satisfies a threshold; and
   selecting the at least one word as the keyword.

8. The computer-implemented method of claim 6, wherein determining the keyword comprises:
   determining that a relevance score between the at least one word and the at least one attribute of the object satisfies a threshold; and
   selecting the at least one word as the keyword.

9. The computer-implemented method of claim 6, wherein:
   the keyword is different from the at least one word; and
   determining the keyword comprises:
      determining that the at least one attribute of the object is indicated by the at least one word in the transcription; and
      determining that a similarity between the at least one word and the keyword satisfies a threshold.

10. The computer-implemented method of claim 9, wherein the keyword is not mentioned in the audio content of the video.

11. The computer-implemented method of claim 6, wherein:
   the object comprises a product for sale; and
   the one or more attributes of the object comprises at least one of a type of the product for sale, a brand name of the product for sale, and a physical feature of the product for sale.

12. The computer-implemented method of claim 6, wherein the tag comprises an identifier (ID) of the object that uniquely identifies the object, the time instance when the at least one word is mentioned in the audio content within the video, and the keyword.

13. The method of claim 6, wherein determining the keyword comprises adjusting a rank of the keyword from a plurality of keywords based at least in part on a user preference.

14. The method of claim 6, further comprising upon receiving a request for the tag, transmitting the tag and the video as a package to a user device.

15. A computer-implemented method comprising:
- displaying a video on a user device;
- receiving a search query for a keyword regarding one or more attributes of an object in the video;
- identifying, in response to the search query, a tag corresponding to the keyword;
- determining, from the tag, at least one time instance in the video related to the keyword; and
- displaying a marker corresponding to the at least one time instance on the user device.

16. The computer-implemented method of claim 15, wherein the keyword comprises a word associated with the one or more attributes of the object that is mentioned in audio content of the video.

17. The computer-implemented method of claim 16, wherein the at least one time instance is an exact time instance when the word is mentioned in the audio content of the video.

18. The computer-implemented method of claim 16, wherein the at least one time instance is a time instance prior to when the word is mentioned in the audio content of the video.

19. The computer-implemented method of claim 15, wherein:
- the keyword comprises a first word that is not mentioned in audio content of the video; and
- identifying the tag corresponding to the keyword comprises:
  - identifying a second word associated with the first word that is mentioned in the audio content of the video; and
  - selecting a tag corresponding to the second word as the tag corresponding to the keyword.

20. The computer-implemented method of claim 15, wherein the marker is displayed at a position within a timeline of the video on the user device, the position corresponding to the at least one time instance related to the keyword.

* * * * *